United States Patent
Alizadeh-Shabdiz et al.

(10) Patent No.: US 9,237,415 B2
(45) Date of Patent: *Jan. 12, 2016

(54) METHOD AND SYSTEM FOR ESTIMATING RANGE OF MOBILE DEVICE TO WIRELESS INSTALLATION

(71) Applicant: Skyhook Wireless, Inc., Boston, MA (US)

(72) Inventors: Farshid Alizadeh-Shabdiz, Wayland, MA (US); Christopher Steger, Boston, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,758

(22) Filed: Mar. 25, 2013

(65) Prior Publication Data

US 2013/0217390 A1 Aug. 22, 2013

Related U.S. Application Data

(63) Continuation of application No. 12/542,849, filed on Aug. 18, 2009, now Pat. No. 8,406,785.

(51) Int. Cl.
*H04W 4/00* (2009.01)
*H04W 4/02* (2009.01)
(Continued)

(52) U.S. Cl.
CPC .. *H04W 4/02* (2013.01); *G01S 5/02* (2013.01); *G01S 5/14* (2013.01); *H04W 64/00* (2013.01)

(58) Field of Classification Search
CPC ....... H04W 48/10; H04W 4/02; H04W 64/00; G01S 5/02; G01S 5/14
USPC ............... 455/456.1–456.3, 456.5, 435.2; 342/450
See application file for complete search history.

(56) References Cited

U.S. PATENT DOCUMENTS

| | | |
|---|---|---|
| 4,415,771 A | 11/1983 | Martinez |
| 4,991,176 A | 2/1991 | Dahbura et al. |

(Continued)

FOREIGN PATENT DOCUMENTS

| | | |
|---|---|---|
| WO | WO-2006/096416 | 9/2006 |
| WO | WO-2006/110181 A2 | 10/2006 |

(Continued)

OTHER PUBLICATIONS

"Delta Encoding", Wikipedia, retrieved from <http://en.wikipedia.org/wiki/Delta_encoding>, on Mar. 1, 2006. (1 pg.).

(Continued)

*Primary Examiner* — Amancio Gonzalez
(74) *Attorney, Agent, or Firm* — Cesari and McKenna, LLP; James A. Blanchette

(57) ABSTRACT

A method of and system for estimating the range of a mobile device to a wireless installation is disclosed. A method of estimating the position of a mobile device includes receiving signals transmitted by fixed-position wireless communication stations in range of a mobile device. One of the wireless communication stations from which signals are received by the mobile device is designated as a serving station and location information is retrieved for said serving station and at least one other neighboring station from which signals are received. For each of the at least one other neighboring stations, a corresponding distance between the serving station and said neighboring station is determined based on the location information. A position of the mobile device is estimated based on the location information for the serving station and said neighboring stations and further based on the distances between the serving station and said neighboring stations.

34 Claims, 12 Drawing Sheets

(51) Int. Cl.
*G01S 5/02* (2010.01)
*G01S 5/14* (2006.01)
*H04W 64/00* (2009.01)

(56) References Cited

U.S. PATENT DOCUMENTS

| | | | |
|---|---|---|---|
| 5,293,645 A * | 3/1994 | Sood | 455/456.2 |
| 5,315,636 A | 5/1994 | Patel | |
| 5,564,121 A | 10/1996 | Chow et al. | |
| 5,940,825 A | 8/1999 | Castelli et al. | |
| 6,134,448 A | 10/2000 | Shoji et al. | |
| 6,249,252 B1 | 6/2001 | Dupray | |
| 6,272,405 B1 | 8/2001 | Kubota et al. | |
| 6,438,491 B1 | 8/2002 | Farmer | |
| 6,665,540 B2 * | 12/2003 | Rantalainen et al. | 455/456.5 |
| 6,678,611 B2 | 1/2004 | Khavakh et al. | |
| 6,799,049 B1 | 9/2004 | Zellner et al. | |
| 6,862,524 B1 | 3/2005 | Nagda et al. | |
| 6,888,811 B2 | 5/2005 | Eaton et al. | |
| 6,915,128 B1 | 7/2005 | Oh | |
| 6,956,527 B2 | 10/2005 | Rogers et al. | |
| 6,978,023 B2 | 12/2005 | Dacosta | |
| 7,020,475 B2 * | 3/2006 | Bahl et al. | 455/456.1 |
| 7,042,391 B2 | 5/2006 | Meunier et al. | |
| 7,123,928 B2 | 10/2006 | Moeglein et al. | |
| 7,167,715 B2 | 1/2007 | Stanforth | |
| 7,167,716 B2 | 1/2007 | Kim et al. | |
| 7,206,294 B2 | 4/2007 | Garahi et al. | |
| 7,254,405 B2 | 8/2007 | Lin et al. | |
| 7,271,765 B2 | 9/2007 | Stilp et al. | |
| 7,305,245 B2 | 12/2007 | Alizadeh-Shabdiz et al. | |
| 7,323,991 B1 | 1/2008 | Eckert et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,417,961 B2 | 8/2008 | Lau | |
| 7,433,694 B2 | 10/2008 | Morgan et al. | |
| 7,471,954 B2 | 12/2008 | Brachet et al. | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 8,019,357 B2 | 9/2011 | Alizadeh-Shabdiz et al. | |
| 8,090,386 B2 | 1/2012 | Alizadeh-Shabdiz et al. | |
| 8,130,148 B2 | 3/2012 | Alizadeh-Shabdiz | |
| 8,406,785 B2 * | 3/2013 | Alizadeh-Shabdiz et al. | 455/456.1 |
| 2002/0184331 A1 | 12/2002 | Blight et al. | |
| 2003/0069024 A1 | 4/2003 | Kennedy | |
| 2003/0087647 A1 | 5/2003 | Hurst | |
| 2003/0114206 A1 | 6/2003 | Timothy et al. | |
| 2003/0125045 A1 | 7/2003 | Riley et al. | |
| 2003/0146835 A1 | 8/2003 | Carter | |
| 2003/0225893 A1 | 12/2003 | Roese et al. | |
| 2004/0019679 A1 | 1/2004 | E et al. | |
| 2004/0039520 A1 | 2/2004 | Khavakh et al. | |
| 2004/0058640 A1 | 3/2004 | Root et al. | |
| 2004/0087317 A1 | 5/2004 | Caci | |
| 2004/0124977 A1 | 7/2004 | Biffar | |
| 2004/0193367 A1 | 9/2004 | Cline | |
| 2004/0205234 A1 | 10/2004 | Barrack et al. | |
| 2004/0263388 A1 | 12/2004 | Krumm et al. | |
| 2005/0020266 A1 | 1/2005 | Backes et al. | |
| 2005/0037775 A1 | 2/2005 | Moeglein et al. | |
| 2005/0055374 A1 | 3/2005 | Sato | |
| 2005/0108306 A1 | 5/2005 | Martizano Catalasan | |
| 2005/0136845 A1 | 6/2005 | Masuoka et al. | |
| 2005/0164710 A1 | 7/2005 | Beuck | |
| 2005/0164845 A1 | 7/2005 | Beuck | |
| 2005/0192024 A1 | 9/2005 | Sheynblat | |
| 2005/0227711 A1 | 10/2005 | Orwant et al. | |
| 2005/0251326 A1 | 11/2005 | Reeves | |
| 2006/0002326 A1 | 1/2006 | Vesuna | |
| 2006/0009235 A1 | 1/2006 | Sheynblat et al. | |
| 2006/0046709 A1 | 3/2006 | Krumm et al. | |
| 2006/0058958 A1 | 3/2006 | Galbreath et al. | |
| 2006/0061476 A1 | 3/2006 | Patil et al. | |
| 2006/0078122 A1 | 4/2006 | Dacosta | |
| 2006/0092015 A1 | 5/2006 | Agrawal et al. | |
| 2006/0095348 A1 | 5/2006 | Jones et al. | |
| 2006/0095349 A1 | 5/2006 | Morgan et al. | |
| 2006/0106850 A1 | 5/2006 | Morgan et al. | |
| 2006/0128397 A1 | 6/2006 | Choti et al. | |
| 2006/0183485 A1 * | 8/2006 | Mizugaki et al. | 455/456.1 |
| 2006/0197704 A1 | 9/2006 | Luzzatto et al. | |
| 2006/0200843 A1 | 9/2006 | Morgan et al. | |
| 2006/0217131 A1 | 9/2006 | Alizadeh-Shabdiz et al. | |
| 2006/0240840 A1 | 10/2006 | Morgan et al. | |
| 2006/0270421 A1 | 11/2006 | Phillips et al. | |
| 2007/0004427 A1 | 1/2007 | Morgan et al. | |
| 2007/0004428 A1 | 1/2007 | Morgan et al. | |
| 2007/0097511 A1 | 5/2007 | Das et al. | |
| 2007/0126635 A1 | 6/2007 | Houri | |
| 2007/0132639 A1 * | 6/2007 | Korneluk et al. | 342/464 |
| 2007/0150516 A1 | 6/2007 | Morgan et al. | |
| 2007/0178911 A1 | 8/2007 | Baumeister et al. | |
| 2007/0184846 A1 | 8/2007 | Horton et al. | |
| 2007/0202888 A1 | 8/2007 | Brachet et al. | |
| 2007/0210961 A1 | 9/2007 | Romijn | |
| 2007/0232892 A1 | 10/2007 | Alizadeh-Shabdiz et al. | |
| 2007/0258408 A1 | 11/2007 | Alizadeh-Shabdiz et al. | |
| 2007/0258409 A1 | 11/2007 | Alizadeh-Shabdiz et al. | |
| 2007/0258420 A1 | 11/2007 | Alizadeh-Shabdiz et al. | |
| 2007/0258421 A1 | 11/2007 | Alizadeh-Shabdiz et al. | |
| 2007/0259624 A1 | 11/2007 | Alizadeh-Shabdiz et al. | |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0045234 A1 | 2/2008 | Reed | |
| 2008/0108371 A1 | 5/2008 | Alizadeh-Shabdiz et al. | |
| 2008/0132170 A1 | 6/2008 | Alizadeh-Shabdiz et al. | |
| 2008/0133124 A1 | 6/2008 | Sarkeshik | |
| 2008/0139217 A1 | 6/2008 | Alizadeh-Shabdiz et al. | |
| 2008/0139219 A1 | 6/2008 | Boeiro et al. | |
| 2008/0176583 A1 * | 7/2008 | Brachet et al. | 455/456.3 |
| 2008/0188242 A1 | 8/2008 | Carlson et al. | |
| 2008/0248741 A1 | 10/2008 | Alizadeh-Shabdiz | |
| 2008/0248808 A1 | 10/2008 | Alizadeh-Shabdiz | |
| 2008/0261622 A1 | 10/2008 | Lee et al. | |
| 2009/0075672 A1 | 3/2009 | Jones et al. | |
| 2009/0149197 A1 | 6/2009 | Morgan et al. | |
| 2009/0154371 A1 | 6/2009 | Alizadeh-Shabdiz et al. | |
| 2009/0175189 A1 | 7/2009 | Alizadeh-Shabdiz et al. | |
| 2009/0252138 A1 | 10/2009 | Alizadeh-Shabdiz et al. | |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0303120 A1 | 12/2009 | Alizadeh-Shabdiz | |
| 2009/0303121 A1 | 12/2009 | Alizadeh-Shabdiz | |
| 2009/0310585 A1 | 12/2009 | Alizadeh-Shabdiz | |
| 2009/0312035 A1 | 12/2009 | Alizadeh-Shabdiz | |
| 2009/0312036 A1 | 12/2009 | Alizadeh-Shabdiz | |
| 2010/0052983 A1 | 3/2010 | Alizadeh-Shabdiz | |
| 2011/0012780 A1 | 1/2011 | Alizadeh-Shabdiz | |
| 2011/0012784 A1 | 1/2011 | Alizadeh-Shabdiz | |
| 2011/0021207 A1 | 1/2011 | Morgan et al. | |
| 2011/0035420 A1 | 2/2011 | Alizadeh-Shabdiz et al. | |
| 2011/0045840 A1 | 2/2011 | Alizadeh-Shabdiz et al. | |
| 2011/0074626 A1 | 3/2011 | Alizadeh-Shabdiz et al. | |
| 2011/0080317 A1 | 4/2011 | Alizadeh-Shabdiz et al. | |
| 2011/0080318 A1 | 4/2011 | Alizadeh-Shabdiz et al. | |
| 2011/0164522 A1 | 7/2011 | Alizadeh-Shabdiz et al. | |
| 2011/0235532 A1 | 9/2011 | Alizadeh-Shabdiz et al. | |
| 2011/0235623 A1 | 9/2011 | Alizadeh-Shabdiz et al. | |
| 2011/0287783 A1 | 11/2011 | Alizadeh-Shabdiz et al. | |
| 2011/0298660 A1 | 12/2011 | Alizadeh-Shabdiz | |
| 2011/0298663 A1 | 12/2011 | Alizadeh-Shabdiz | |
| 2011/0298664 A1 | 12/2011 | Alizadeh-Shabdiz | |

(56) References Cited

U.S. PATENT DOCUMENTS

| | | | |
|---|---|---|---|
| 2011/0306357 | A1 | 12/2011 | Alizadeh-Shabdiz et al. |
| 2011/0306358 | A1 | 12/2011 | Alizadeh-Shabdiz et al. |
| 2011/0306359 | A1 | 12/2011 | Alizadeh-Shabdiz et al. |
| 2011/0306360 | A1 | 12/2011 | Alizadeh-Shabdiz et al. |
| 2011/0306361 | A1 | 12/2011 | Alizadeh-Shabdiz et al. |
| 2012/0007775 | A1 | 1/2012 | Alizadeh-Shabdiz |

FOREIGN PATENT DOCUMENTS

| | | |
|---|---|---|
| WO | WO-2007/081356 A2 | 7/2007 |
| WO | WO-2011/022300 A1 | 2/2011 |

OTHER PUBLICATIONS

"Huffman Coding", Wikipedia, retrieved from <http://en.wikipedia.org/wiki/Huffman_coding> on Mar. 1, 2006. (6 pgs.).

"Terminal Equipment and Protocols for Telematic Services: Information Technology-Digital Compression and Coding of Continuous-Tome Still Images—Requirements and Guidelines," International Telecommunication Union, Sep. 1992. (186 pgs).

Algorithms, "Eulerian Cycle/Chinese Postman," published on Jun. 2, 1997, http://www2.toki.or.id/book/AlgDesignManual/BOOK/BOOK4/NODE165.HTM (4 pgs.).

Griswold et al., "ActiveCampus—Sustaining Educational Communities through Mobile Technology." UCSD CSE Technical Report #CS200-0714, 2002 (19 pgs.).

Hazas, M., et al., "Location-Aware Computing Comes of Age," IEEE, vol. 37, Feb. 2004 (pp. 95-97).

Hellebrandt, M., et al., "Estimating Position and Velocity of Mobile in a Cellular Radio Network," IEEE Transactions on Vehicular Technology, vol. 46, No. 1, Feb. 1997 (pp. 65-71).

International Search Report and Written Opinion of the International Searching Authority for International Application No. PCT/US2010/045438, dated Oct. 6, 2010 (9 pgs.).

International Search Report of the International Searching Authority for International Application No. PCT/US05/39208, mailed Jan. 29, 2008 (3 pgs.).

International Search Report and Written Opinion of the International Searching Authority for International Application No. PCT/US07/62721, mailed Nov. 9, 2007 (8 pgs.).

International Search Report of the International Searching Authority for International Application No. PCT/US07/81929, mailed Apr. 16, 2008 (2 pgs.).

Kawabata, K. et al., "Estimating Velocity Using Diversity Reception," IEEE, 1994 (pp. 371-374).

Kim, M., et al., "Risks of using AP locations discovered through war driving,"; Pervasive Computing, May 19, 2006 (pp. 67-81).

Kirsner, S., "One more way to find yourself," The Boston Globe, May 23, 2005, Retrieved from www.boston.com (2 pgs.).

Krumm, J., et al., "LOCADIO: Inferring Motion and Location from Wi-Fi Signal Strengths," First Annual International Conference on Mobile and Ubiquitous Systems: Networking and Services, Aug. 2004 (10 pgs.).

Kwan, M., "Graphic Programming Using Odd or Even Points," Chinese Math. 1, 1960. (pp. 273-277).

Lamarca, A., et al., "Place Lab: Device Positioning Using Radio Beacons in the Wild,"; Pervasive Computing, Oct. 2004 (pp. 116-133).

Lamarca, A., et al., "Self-Mapping in 802.11 Location Systems," Ubicomp 2005: Ubiquitous Computing, Aug. 23, 2005 (pp. 87-104).

Muthukrishnan, K., et al., "Towards Smart Surroundings: Enabling Techniques and Technologies for Localization," Lecture Notes in Computer Science, vol. 3479, May 2005, (11 pgs.).

Weisstein, Eric W., "Chinese Postman Problem," Mathworld—A Wolfman Web Resource, retrieved from http://mathworld.wolfram.com/ChinesePostmanProblem.html, 2010 (1 pg.).

\* cited by examiner

METHOD AND SYSTEM FOR ESTIMATING RANGE OF MOBILE DEVICE TO WIRELESS INSTALLATION

This application is a continuation of U.S. patent application Ser. No. 12/542,849, entitled Method and System for Estimating Range of Mobile Device to Wireless Installation, filed Aug. 18, 2009, now issued as U.S. Pat. No. 8,406,785, and incorporated by reference herein in its entirety.

BACKGROUND OF THE INVENTION

1. Field of the Invention

This invention generally relates to estimating the position of the mobile device in a wireless communication network and, more specifically, to determining the distance of the mobile device from fixed-position wireless communication stations and using those distances to estimate the position of the mobile device.

2. Description of Related Art

In recent years the number of mobile computing and communication devices has increased dramatically, creating the need for more advanced mobile and wireless services. Mobile email, walkie-talkie services, multi-player gaming and call-following are examples of new applications for mobile devices. Because mobile devices are not tethered to any fixed location, users are also beginning to demand applications that are able to discover and use their current location. On the regulatory front, the FCC enhanced 911 rules mandate that mobile telephones must be able to supply location information to emergency operators when making 911 calls (www-.fcc.gov/pshs/services/911-services/enhanced911/). In each case, it is essential that the mobile device be able to estimate its location and return that information to the user or other entities.

Location-based services (LBS) are an emerging area of mobile applications that leverage mobile location systems. Examples of these services range from obtaining local weather, traffic updates, and driving directions to child trackers, buddy finders and urban concierge services. The new location-aware devices that facilitate LBS rely on a variety of positioning technologies that all use the same basic concept. By measuring radio signals originating from or arriving at known reference points, these technologies can estimate the mobile device's position relative to the reference points. In cellular positioning systems (CPS) the reference points are the cellular installations (referred to in this work as cells or cell towers), and the observed signals are transmissions defined by cellular communication standards including but not limited to GSM, cdmaOne, UMTS, cdma2000, WiMax, and LTE.

As used herein, cellular positioning systems are limited to technologies that use only cellular installations and signals for location estimation. Thus, systems such as the satellite-based global positioning system (GPS) (www8.garmin.com/aboutGPS/), hybrid satellite-cellular assisted-GPS (A-GPS) (http://www.gpsworld.com/gpsworld/article/articleDetail.jsp?id=12287), wi-fi positioning (WPS) based on IEEE 802.11 access points (www.skyhookwireless.com/howitworks/wps.php), or hybrid wifi-GPS positioning (www.skyhookwireless.com/howitworks/) are not considered a cellular positioning system. In addition, pattern matching or so-called "fingerprinting" CPS technologies as developed by Placelab and others ("Practical Metropolitan-Scale Positioning for GSM Phones", Chen et al, available at www.placelab.org/publications/pubs/gsm-ubicomp2006.pdf) are excluded from the meaning of cellular positioning systems because those approaches have no concept of reference point location or range estimation.

There are many fundamentally different approaches to designing cellular positioning systems, but they can be organized in terms of the observable signal parameters that are used for location estimation. Time-based systems use measurements of the time between transmission and reception of a signal to estimate the distance between the transmitter and the receiver. Such systems employ time of arrival (TOA) or time-difference of arrival (TDOA) schemes to generate range estimates for use in a variety of algorithms to generate position estimates for the user (US RE38,808, Schuchman, et al; US 2002/007715 A1, Ruutu, et al; www.trueposition.com/web/guest/white-papers#). Time-based systems often require tight synchronization between the different cellular installations because the error in the range estimates is directly related to the synchronization error between the cells. In systems such as cdmaOne where synchronization is intrinsic to the standard, it is relatively straightforward to implement time-based range estimation. However, in asynchronous systems such as GSM and UMTS, additional equipment is often installed at each cell at significant additional cost (U.S. Pat. No. 6,275,705 B1, Drane, et al; U.S. Pat. No. 6,526,039 B1, Dahlman, et al.; U.S. Pat. No. 6,901,264 B2, Myr; www.trueposition.com/web/guest/trueposition-location-platform).

As part of the WCDMA standard, time-based range estimation can be calculated according to the round trip time (RTT) of a packet sent from the cell to the mobile and returned immediately from the mobile to the cell (www.trueposition.com/web/guest/e-cid;). This approach does not require synchronization, but it only works with network-based positioning systems. That is, the network can learn the position of the mobile, but the mobile does not know its own position unless it receives a specific message carrying the network's position estimate. Regardless of the specific range-estimation technique, time-based systems are extremely susceptible to errors caused by multipath propagation. Essentially, late-arriving reflections of the signal cause the system to overestimate the mobile to cell range.

As an alternative to time-based range estimation, many systems use received signal strength (RSS) to estimate the distance from the mobile to the transmitting cell ("Indoor/Outdoor Location of Cellular Handsets Based on Received Signal Strength" by Zhu and Durgin, available at www.propagation.gatech.edu/radiolocation/PolarisReport.pdf). Well-known pathloss models show that signal power falls exponentially with distance, so knowledge of the pathloss exponent and other parameters such as antenna gain and transmit power allows the positioning system to compute range estimates. However, signal power can vary dramatically in unpredictable ways due to fading and other environmental factors. Thus, the uncertainty inherent to RSS measurements limits the accuracy of RSS-based range estimates. Alternatively, the RSS can be used directly in centroid-based schemes in which there is no explicit range estimation. Nearest neighbor-type location estimation (also known as Cell ID) in which the mobile's position is estimated using only the most powerful observed cell is a degenerate case of RSS-based positioning.

BRIEF SUMMARY OF THE INVENTION

In one aspect, the invention features a method of and system for estimating the range of a mobile device to a wireless installation.

In another aspect, the invention features a method of estimating the position of a mobile device, including the mobile device receiving signals transmitted by a plurality of fixed-position wireless communication stations in range of the mobile device. The method also includes designating one of the plurality of fixed-position wireless communication stations from which signals are received by the mobile device as a serving station and retrieving location information for said serving station and at least one other neighboring station of the plurality of fixed-position wireless communication stations from which signals are received by the mobile device. For each of the at least one other neighboring stations, a corresponding distance between the serving station and said neighboring station is determined based on the location information and a position of the mobile device is estimated based on the location information for the serving station and said neighboring stations and further based on the distances between the serving station and said neighboring stations.

In a further aspect, the estimating the position of the mobile device includes applying a weighting factor to the location information for each of the serving station and the neighboring stations and determining a weighted average position based on the location information and weighting factors corresponding to said stations. Optionally, the weighting factors for said stations are based on the distance between the serving station and the neighboring stations so that stations that are closer to the serving station relative to other stations have corresponding weighting factors that are higher in value relative to weighting factors corresponding to other stations that are relatively more distant from the serving station.

In yet another aspect, for at least one of the serving station and the neighboring stations, a first weighting factor is determined for said station based on the distance between the serving station and the corresponding station so that stations that are closer to the serving station relative to other stations have corresponding first weighting factors that are higher in value relative to first weighting factors corresponding to other stations that are relatively more distant from the serving station. A distance from the mobile device to at least one of the serving station and the neighboring stations is estimated based on the signals received by the mobile device transmitted by said stations, and, for each of said stations for which distances were estimated based on the signals received by the mobile device, a second weighting factor corresponding to said station is determined based on the signals received by the mobile device. This aspect further includes, for at least one of the serving station and the neighboring stations, determining a hybrid weighting factor for said station based on the first and the second weighting factor corresponding to said station. Estimating the position of the mobile device includes applying the hybrid weighting factors to the location information for the corresponding stations and determining a weighted average position based on the location information and hybrid weighting factors corresponding to said stations. Optionally, estimating the distance from the mobile device to at least one of the serving station and the neighboring stations is based on at least one of received signal strength-based techniques, time-of-arrival-based techniques, and time-difference-of-arrival-based techniques.

In yet a further aspect of the invention, a received signal strength value is measured for at least a portion of the signals received by the mobile device transmitted by at least one of the serving station and the neighboring stations, and a highest received signal strength value is determined. The station having the highest received signal strength value is designating as the serving station. A second highest received signal strength value is also determined. Estimating the distance from the mobile device to at least one of the serving station and the neighboring stations is based on the received signal strength measurements, and a hybrid weighting factor is determined, at least in part, by combining the first and the second weighting factors according to a ratio based on (a) a difference between the highest and second highest received signal strength value and (b) a dynamic range of received signal strength values.

BRIEF DESCRIPTION OF THE SEVERAL VIEWS OF THE INVENTION

DETAILED DESCRIPTION OF THE INVENTION

Preferred embodiments of the invention provide methods for estimating the distances from a mobile device to fixed-position wireless installations, e.g., cellular network installations, and using those distances to estimate the location of the mobile device. Implementations of the invention use the principles of wireless network planning, e.g., cellular network planning, to estimate the distance from a wireless installation to a mobile device based on the distances between wireless installations. In some embodiments, the range estimation method is applied to centroid-based location estimation. However, multilateration, least-squares, or any other location estimation determinations that rely on range estimation are within the scope of the invention. The advantages of the techniques disclosed herein include the fact that they require neither additional hardware nor site-specific measurement or modeling data. Rather, embodiments of the invention can be implemented extremely inexpensively as a software-only solution, and are extremely resistant to modeling errors that typically plague RSS-based systems.

For the sake of simplicity, embodiments of the invention are described with reference to a cellular network system. For example, the fixed-position wireless installations can be a cellular network site, i.e., cell site, cell tower, base transceiver station, base station, and/or mobile phone mast. As is generally known, cell sites can be placed on a radio mast or tower and/or other structure, such as a building. Thus, while the terms "cellular" and "cells" are used herein, it is understood that other wireless network systems and fixed-position transceivers are within the scope of the invention.

Figure 1:
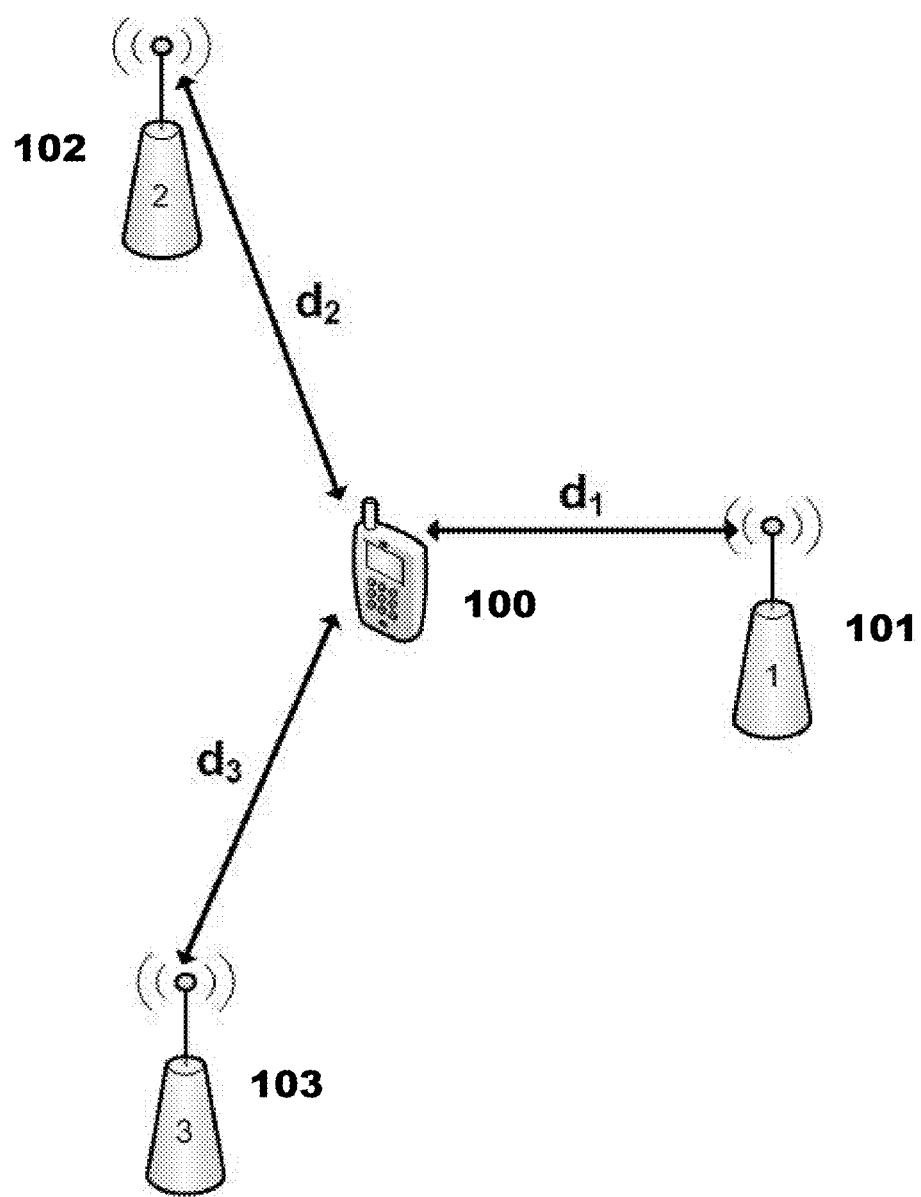
FIG. 1 illustrates a typical method of locating a mobile device using ranges from reference points.

In many systems for mobile device position estimation, such as GPS, signals from reference points with known locations are used to estimate the range from the mobile to each reference point, and those ranges are used to estimate the position of the mobile. FIG. 1 illustrates a typical method of locating a mobile device 100 using ranges from reference points 101, 102, and 103. In FIG. 1, mobile device 100 receives signals from reference points 101, 102, and 103. Using the received signals, mobile 100 estimates distance $d_1$ from reference point 101, distance $d_2$ from reference point 102, and distance $d_3$ from reference point 103. Then, using the known locations of the reference points and the three distance estimates, mobile 100 is able to compute an estimate of its location.

Embodiments of the invention include a method for estimating the range from a mobile device to a cellular network installation (herein "cell-to-mobile distance") based on the distance between the particular cellular installation and other installations in the area (herein "cell-to-cell distances"). In addition, the techniques disclosed herein offer several methods for employing estimated cell-to-mobile distances in estimating the position of the mobile device.

As used herein, the term "mobile device" can be taken to mean any cellular telephone, portable computer, portable navigation device, or any other portable or vehicular device that is able to receive the signals transmitted by a cellular communication network. The cellular network may use standards such as GSM, IS-95, UMTS, WiMax, CDMA2000, or any others in which several antennas providing service to adjacent or overlapping areas are installed and operated according to a single cellular communication standard. Embodiments of the invention described herein do not require that either the cellular network or the mobile device deploy additional hardware or alter communication protocols for purposes of location. Embodiments of the invention also do not require the ability to ascertain time-of-arrival (TOA), time-difference-of-arrival (TDOA), angle of arrival (AOA), or round trip time (RTT) of the received signals.

Implementations of the invention do require that the mobile device have a means to estimate which cell is closest to its current location. As an example, the mobile may estimate that the observed cell with the maximum received signal strength (RSS) is the closest. Alternatively, the network may use higher layer protocols to assign the mobile to the closest cell. From this point forward, we will refer to the cell closest to the mobile as the "serving cell", even though there may not be any actual service provided by the serving cell to the mobile. All cells that are not designated as the serving cell are called "neighbor cells".

In order to determine the location of any observed cells, the mobile must be able to receive and interpret signals indicating the identity of each cell, and the mobile must have access to a database of locations that can be used to associate location information with the identifiers of the observed cells. Such a database may be stored on the mobile device or accessed over a network that may or may not be the same cellular communication network used for position estimation.

In one implementation, the distance between a serving cell and a neighbor cell is used to estimate the distance from the mobile to the neighbor cell. Based on the assumption that the distance from the mobile to the serving cell is much smaller than the distance from the serving cell to neighboring cells, the distance from the serving cell to the neighboring cells is used as an estimate of the distance from the mobile to the neighboring cells.

Figure 2:
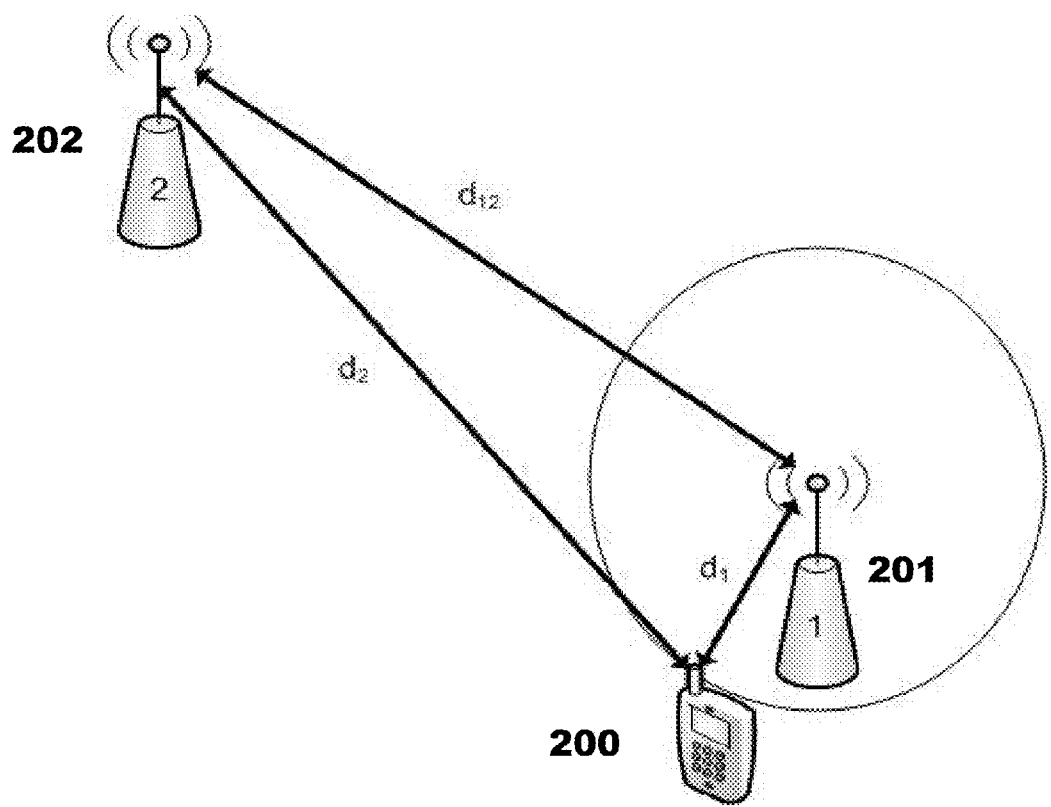
FIG. 2 illustrates a mobile device estimating its distance from a neighboring cell.

FIG. 2 illustrates a mobile device 200 estimating its distance from a neighboring cell 202. Referring to FIG. 2, a serving cell 201 and a neighboring cell 202 are detected by mobile device 200. The distance from serving cell 201 to the mobile device 200 is $d_1$, and the distance from the neighboring cell 202 to mobile device 200 is $d_2$. The distance between serving cell 201 and neighboring cell 202 is $d_{12}$. Because of the fact that $d_2$ is significantly larger than $d_1$, we can say that $d_{12} \approx d_2$. Specifically, we say that $$\hat{d}_2 = d_{12}$$

where $\hat{d}_i$ is the estimate of $d_i$. More generally, we estimate the distance from the mobile to N detected cells as $$\hat{d}_i = d_{1i}$$

for $i = 1 \ldots N$, where, without loss of generality, the index 1 is assigned to the serving cell. It is noted that in some use cases $d_2$ may not be significantly larger than $d_1$; such cases are addressed using alternative methods, discloses below.

Figure 3:
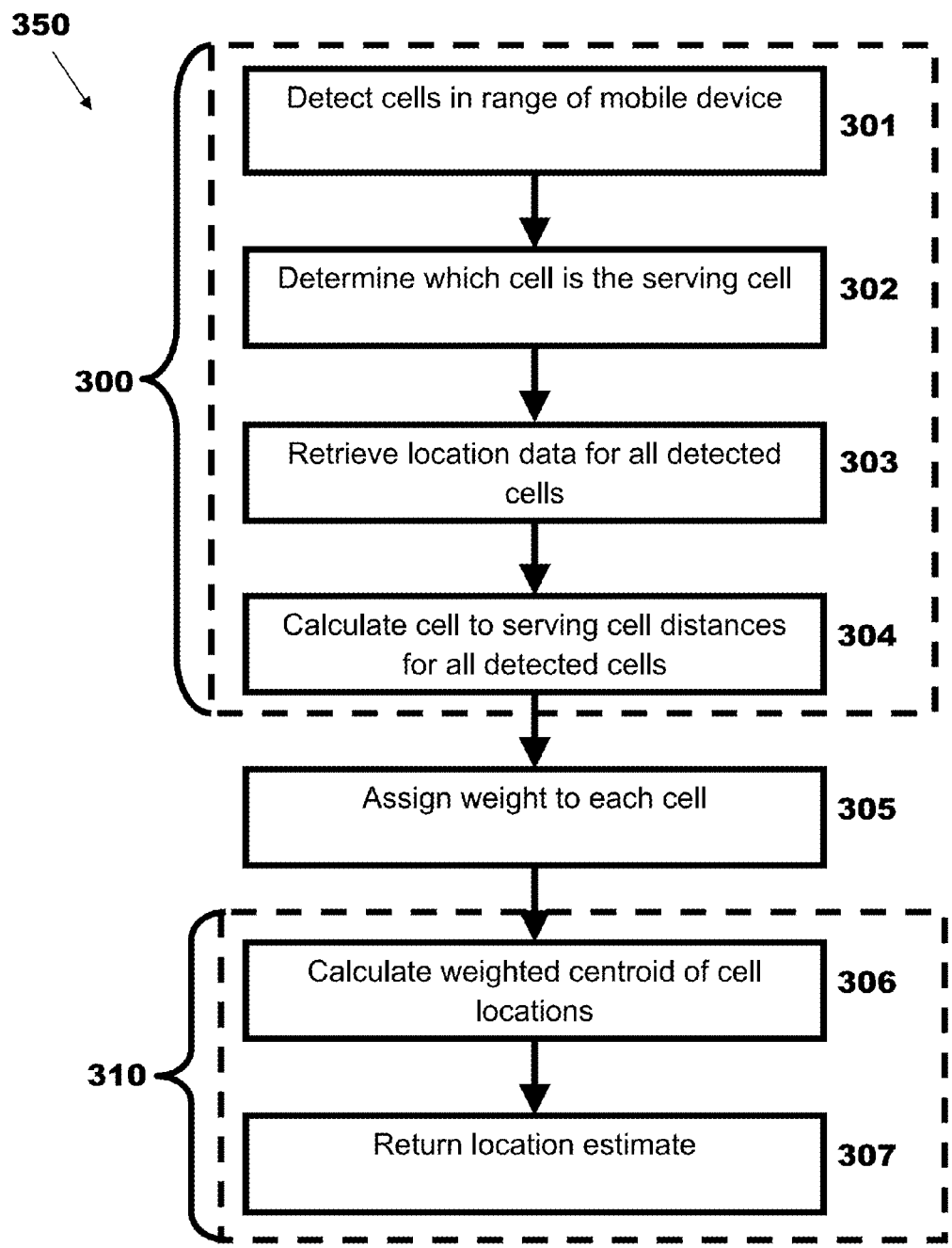
FIG. 3 illustrates a method for estimating the location of a mobile device.

In order to use cell-to-mobile distance estimates to return an estimated mobile location, embodiments of this invention use refinements of a basic centroid. FIG. 3 illustrates a method 350 for estimating the location of a mobile device. In general, the centroid of a set of points is the average of those points. Specifically, the latitude of the centroid is the average of the latitudes of the set of points, and the longitude of the centroid is the average of the longitudes of the points. When applied to cellular position estimation, a centroid determination technique estimates the location of the mobile as the average of the positions of the cells observed by the mobile device.

Referring to FIG. 3, a technique for estimating the location of a mobile device includes detecting cells in range of a mobile device (step 301). Next, a determination is made as to which of the detected cells is the serving cell (step 302). Also, location data for each of the cells in range is retrieved (step 303). This location data is used to calculate cell to serving cell distances for all detected cells (step 304). As will be described in more detail below, weights are assigned to each cell (step 305) for use in calculating a weighted centroid of the detected cell locations (step 306). The mobile device's location is estimated by mixing the locations of N cells detected by the mobile according to a normalized set of weights, $\{w_i\}_{i=1}^{N}$, as stated in the following equations, $$Lat_{mobile} = \sum_{i=1}^{N} w_i Lat_i$$

$$Lon_{mobile} = \sum_{i=1}^{N} w_i Lon_i$$

$$\sum_{i=1}^{N} w_i = 1$$

where $Lat_i$ and $Lon_i$ are the latitude and longitude, respectively, of the ith detected cell. In one implementation of the invention, equal weights are applied to each cell. In other implementations, cells that are relatively closer to the mobile device are assigned relatively larger weights.

Figure 4:
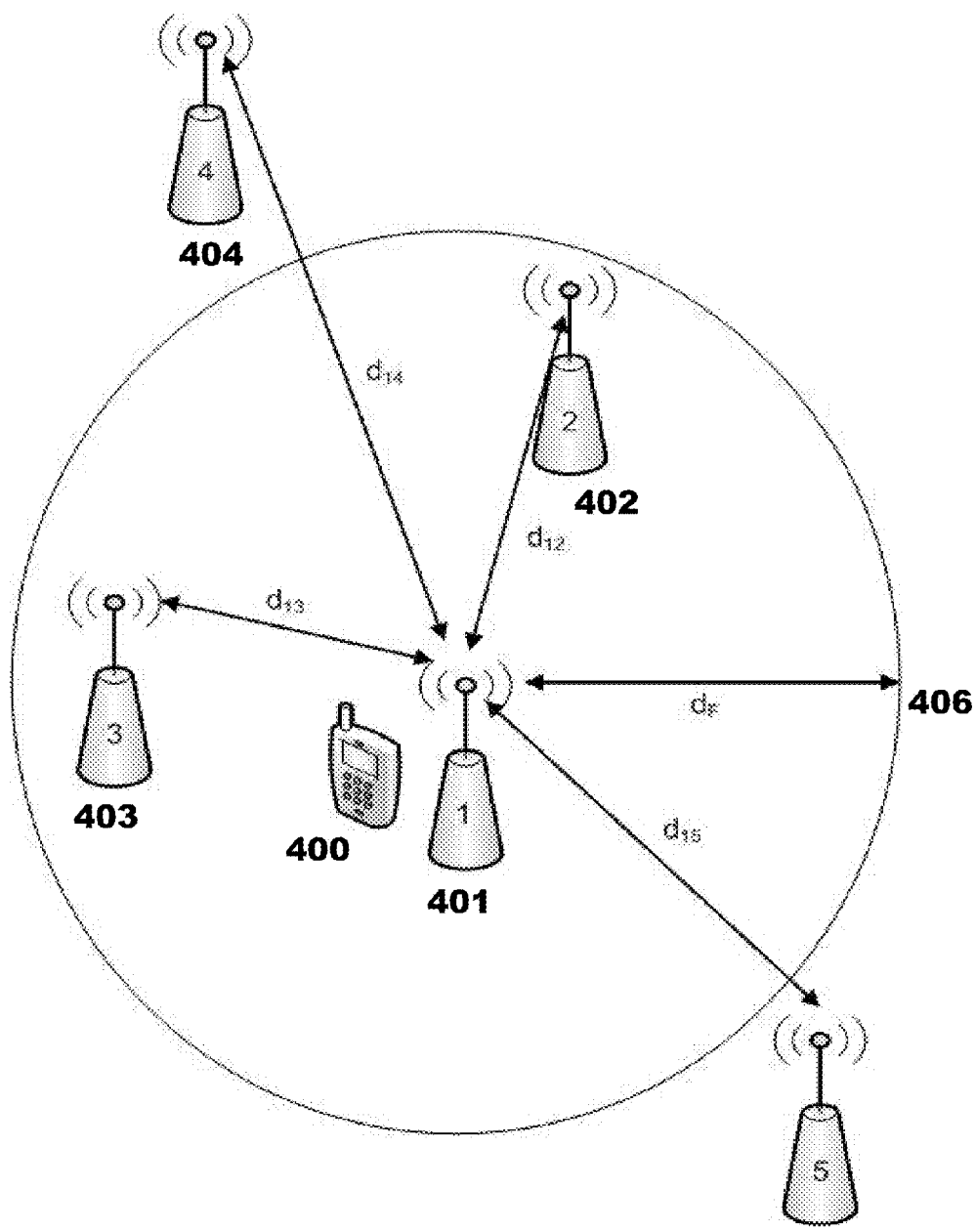
FIG. 4 is an illustration of a Distance Filtering concept.

One illustrative example of the invention is a method of mobile position estimation referred to herein as "Distance Filtering." In this embodiment, the weights assigned to each cell in step 305 are binary values based on the cell-to-cell distances determined in step 304. Specifically, each $w_i$ is assigned according to whether cell-to-cell distance $d_{1i}$ exceeds a filtering threshold, $d_F$. The binary weights are computed as follows:

$$w_i = \frac{I(d_{1i} \le d_F)}{\sum_{i=1}^{N} I(d_{1j} \le d_F)}$$

where $I(x)$ is an identity function that equals 1 when the argument is true and 0 when the argument is false. FIG. 4 is an illustration of the Distance Filtering concept. Referring to FIG. 4, a mobile device 400 implementing the Distance Filtering technique assigns nonzero weight to neighboring cells 402 and 403, whose estimated distance from a serving cell 401 is less than a filtering threshold, $d_F$, 406. One illustrative value of $d_F$ is 1000 meters. The technique calls for equal positive weight to be assigned to all of the cells (including the serving cell) 401, 402, and 403 that are nearer to serving cell 401 than $d_F$ 406. The technique assigns zero weight to neighboring cells 404 and 405 whose distance from the serving cell exceeds $d_F$ 406.

Figure 5:
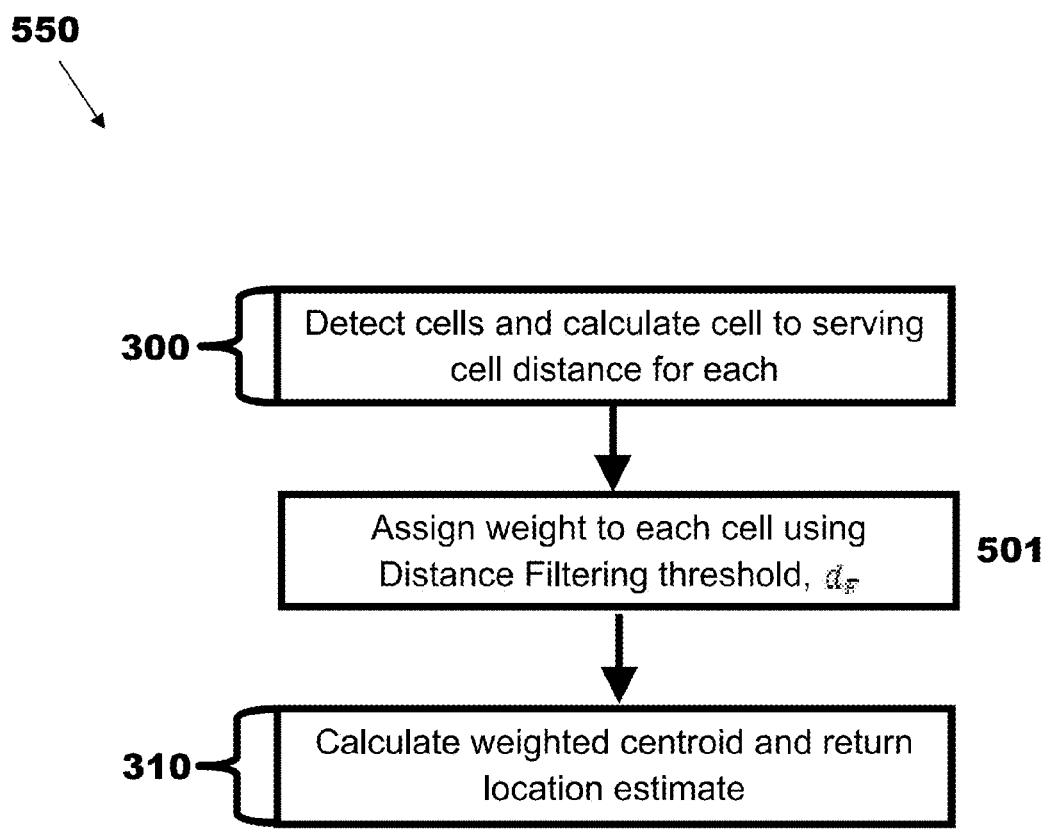
FIG. 5 illustrates a method for implementing the Distance Filtering concept shown in FIG. 4.

FIG. 5 illustrates a method 550 for implementing the Distance Filtering concept shown in FIG. 4. The first steps 300 of method 550 are the same as those shown in group 300 of FIG. 3 and described in more detail above. Namely, method 550 calls for a mobile device to detect cells in range, designate a serving cell, retrieve location data, and calculate all cell to serving cell distances. The next step is to compute and assign binary weights for all cells by applying the filtering threshold, $d_F$, (step 501). Then, once the weights are assigned, the location estimate is calculated and returned as shown in the steps of group 310 of FIG. 3 as set forth above. For simplicity's sake, groups 300 and 310 of certain steps of FIG. 3, and their corresponding description, are used to illustrate other embodiments and implementations described herein.

Figure 6:
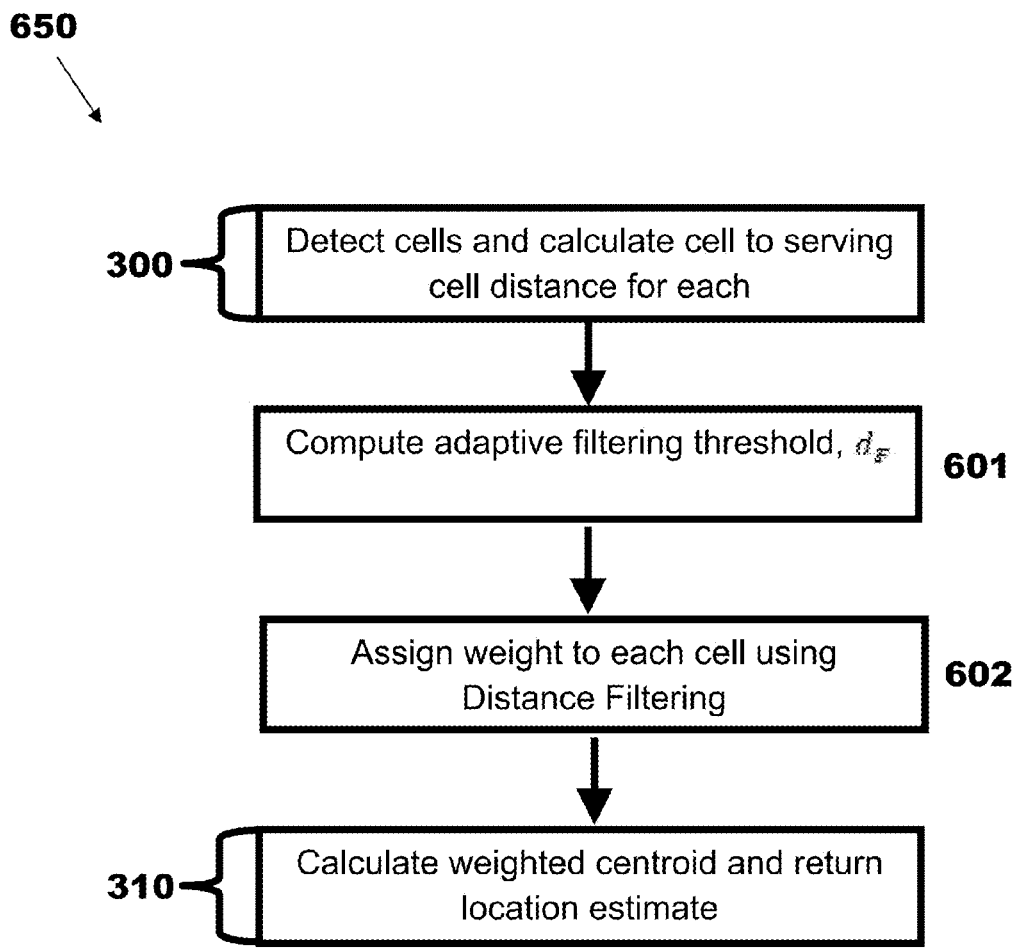
FIG. 6 illustrates a method for implementing the Distance Filtering concept with a dynamic filtering threshold.

In another embodiment, the value of the filtering threshold, $d_F$, varies. FIG. 6 illustrates a method 650 for implementing the Distance Filtering concept with a dynamic filtering threshold, $d_F$. Under this implementation, the steps of group 300 are performed as described above. Next, filtering threshold, $d_F$, is determined dynamically (step 601) as a function of the cell-to-cell distances. For example, let $$d_F = \max\{A^* \text{median}\{d_{1i}\}_{i=1}^N, B\}$$

where A and B are positive constants. Reasonable values for A and B would be 1 and 1000, respectively. Further, the weights are assigned to each detected cell (step 602), and the steps of group 310 are completed to determine a location estimate. Thus, in this implementation, the Distance Filtering technique can adapt to different levels of cell density by adjusting the filtering threshold before assigning cell weights.

Figure 7:
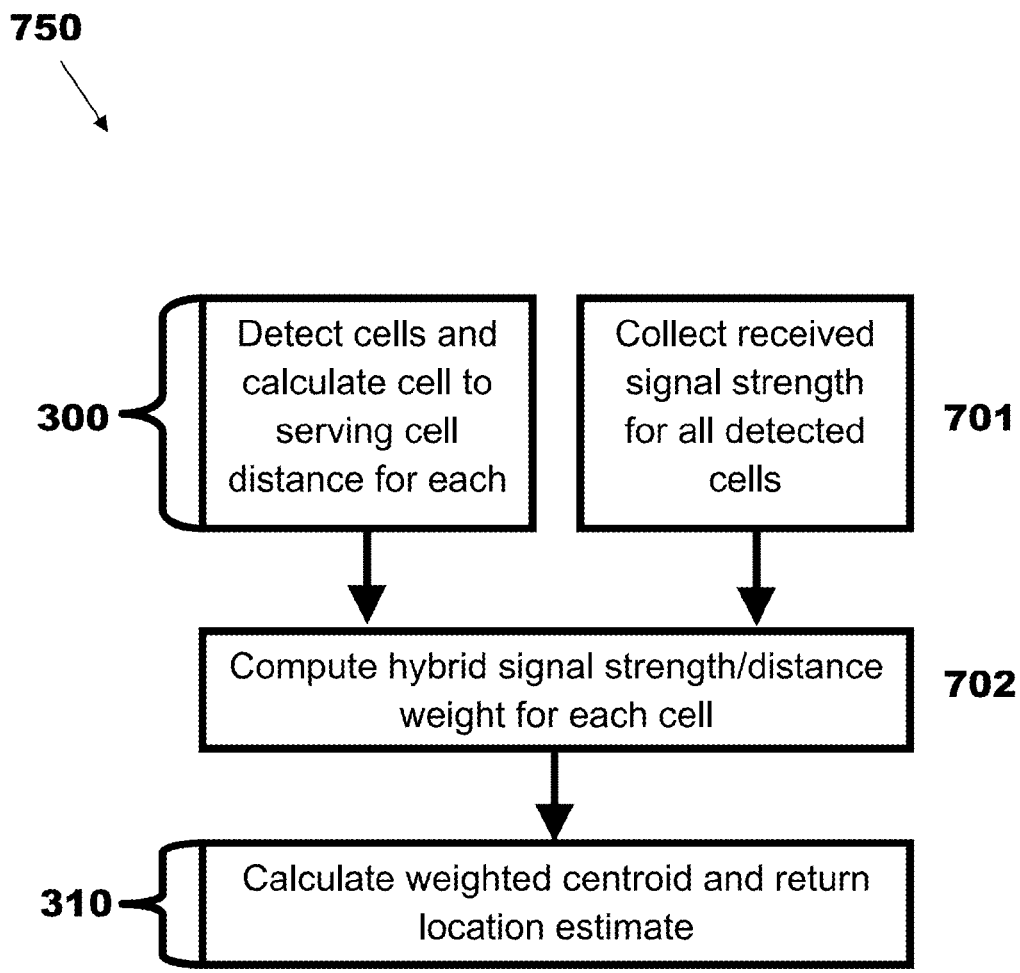
FIG. 7 illustrates a method for implementing the Distance Filtering concept in combination with a power threshold metric.

FIG. 7 illustrates another method 750 of estimating a location of a mobile device. In method 750, the weights assigned to the detected cells are computed using the Distance Filtering techniques described herein in combination with other binary metrics using binary operations such as AND and/or OR. In such an implementation, the steps of group 300 are performed as described above. In addition, a received signal strength (again, RSS) from cell i, represented by $p_i$ is determined (step 701). Next, the detected RSS values, $p_i$, are compared to an RSS threshold value, $p_0$, and a hybrid signal strength/distance weight is calculated to be applied to each cell as follows:

$$w_i = \frac{I((d_{1i} \le d_F) \& (p_i \ge p_0))}{\sum_{j=1}^{N} I((d_{1j} \le d_F) \& (p_j \ge p_0))}$$

where the ampersand represents the binary AND operator. An estimated location of the mobile device is then calculated using a weighted centroid, as set forth in the steps of group 310.

Figure 8:
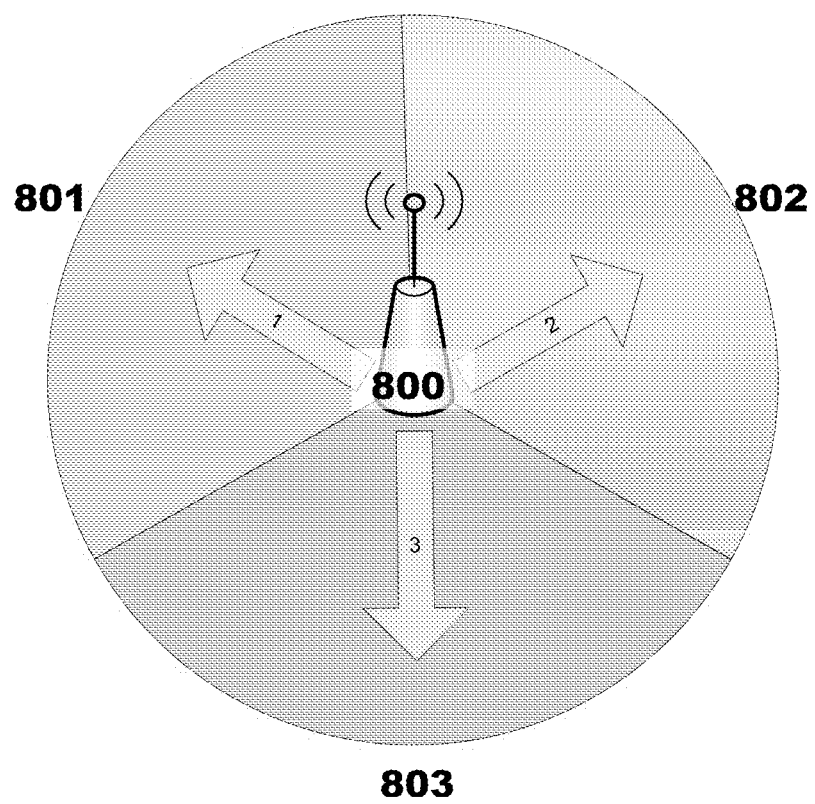
FIG. 8 illustrates an example of collocated cells serving three sectors.

In cell tower planning, it is common practice to use collocated cells or "sectors" to provide service to adjacent regions. FIG. 8 illustrates an example of collocated cells serving three sectors. Though the sectors direct their signal power in different directions, it is common for a mobile device to observe more than one sector simultaneously. Specifically, a mobile device near cell tower 800 could observe sectors 801 and 802 at the same time. Because the actual antennas providing cellular coverage to sector 801, 802, and 803 are all located on tower 800, the cell-to-cell distances are all zero. For instance, if sector 801 were the serving cell and sector 802 were observed by the mobile device as a neighbor cell, the distance between the serving cell and the neighboring cell would be determined to be zero.

For sectors near-to or collocated with the serving cell, the use of cell-to-cell distance as a proxy for cell-to-mobile device distance becomes less accurate as the cell-to-cell distance approaches zero. The same problem arises when trying to estimate the distance from the mobile device to the serving cell. Thus, in some implementations of the invention, the issue that the cell-to-cell distance between the serving cell and itself or any collocated cells is always zero is addressed by assigning a default minimum value or "floor" to the distance estimates. That is, if the cell-to-cell distance falls below the floor, then the distance estimate is assigned a minimum allowed value, $d_0$. Therefore, the cell-to-cell distance is as follows:

$$\hat{d}_i = \max\{d_{1i}, d_0\}$$

To provide maximum utility, the minimum allowed value, $d_0$, should be a good estimate of the distance from the mobile to the serving cell (and, thus, any neighboring cells collocated with the serving cell). While there are many ways to choose the minimum allowed value, $d_0$, based on received signal strength, doing so requires knowledge of several system and environment-dependent parameters including transmit power, antenna gain, and pathloss exponent. In the absence of such specific knowledge, the techniques set forth herein define the minimum allowed value, $d_0$, in terms of the set, $\{d_{1i}\}$, of cell to serving cell distances as follows:

$$d_0 = K^* \text{median}\{d_{i1}\},$$

which is approximately proportional to the coverage radius of the serving cell. The value of K is a positive constant less than 1. For example, a value of $$K = \frac{2}{3}$$

is generally effective in practice. In the degenerate case where the median is itself zero (as would occur if the majority of the visible cells were collocated with the serving cell), a hard limit under $d_0$ is set as follows:

$$d_0 = \max\{K^* \text{median}\{d_{i1}\}, C\},$$

where C is another positive constant. A reasonable value for C is on the order of 100 meters.

Figure 9:
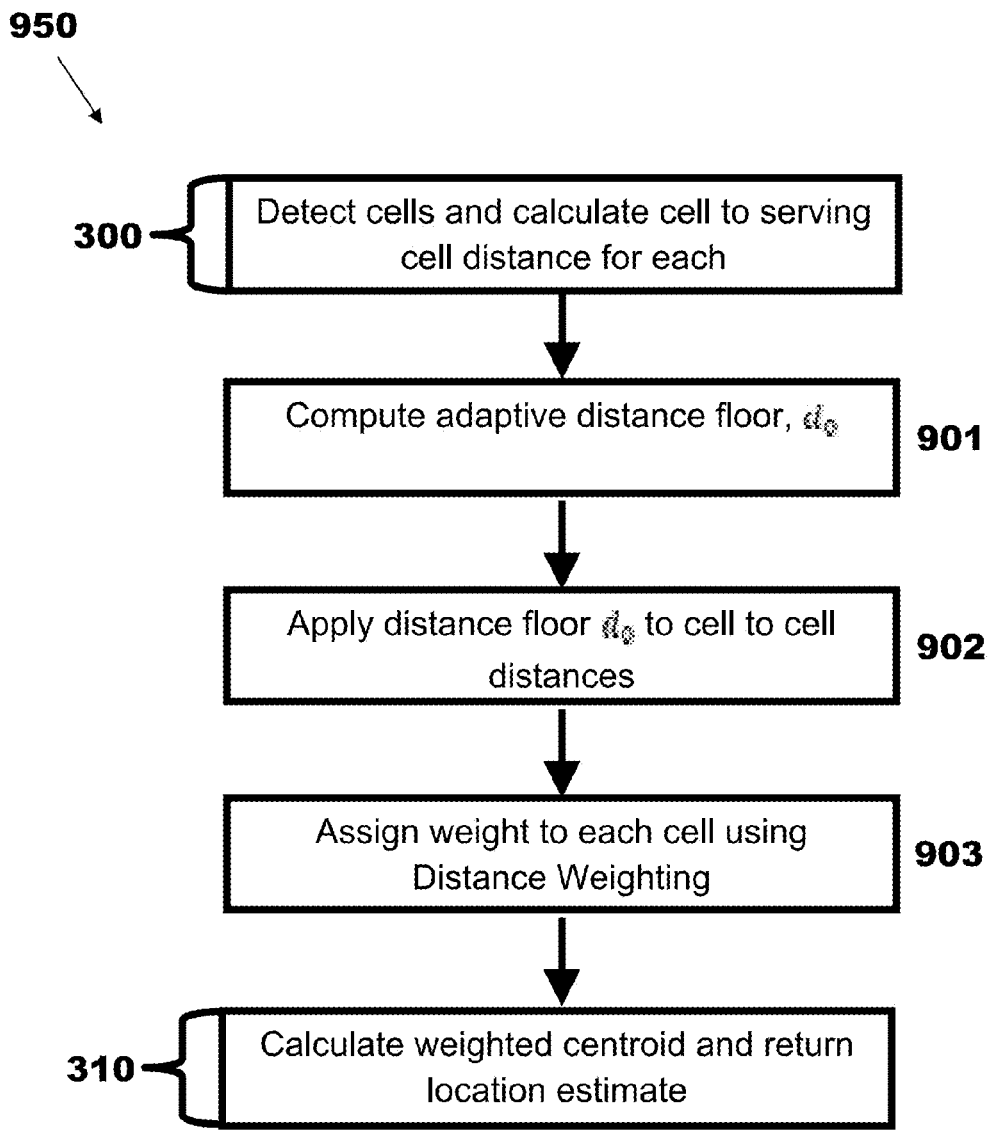
FIG. 9 illustrates a method for estimating a location of a mobile device using neighbor cell distance estimation and serving cell distance estimation.

FIG. 9 illustrates a method 950 for estimating a location of a mobile device using neighbor cell distance estimation and serving cell distance estimation, herein "Distance Weighting." Such an implementation combines neighbor cell distance estimation with serving cell distance estimation to form an integrated method for estimating mobile position. In a Distance Weighting implementation, all observed cells are used in the position estimate. Specifically, the weights assigned to the cells are as follows:

$$w_i = \frac{\frac{1}{\hat{d}_i}}{\sum_{j=1}^{N} \frac{1}{\hat{d}_j}},$$

where, for example, $$\hat{d}_i = \max\{d_{1i}, d_0\},$$

$$d_0 = \max\left\{\frac{2}{3} * \text{median}\{d_{i1}\}, 100\right\}.$$

This technique prevents division by zero and avoids giving disproportionately-large weights to the serving cell and its collocated sectors.

Referring again to FIG. 9, a mobile device begins by performing the steps of group 300. The method then uses the distances determined in steps 300 to compute a minimum allowed value, $d_0$, appropriate to the local cellular environment (step 901). The method next applies the minimum allowed value, $d_0$, to the cell-to-cell distances so that all distances are estimated to be greater than zero (step 902). Using the modified distance estimates, the mobile uses the Distance Weighting function, above, to assign weights to each cell (step 903). Finally, the assigned weights are used to compute a position estimate according to the steps of group 310.

Figure 10:
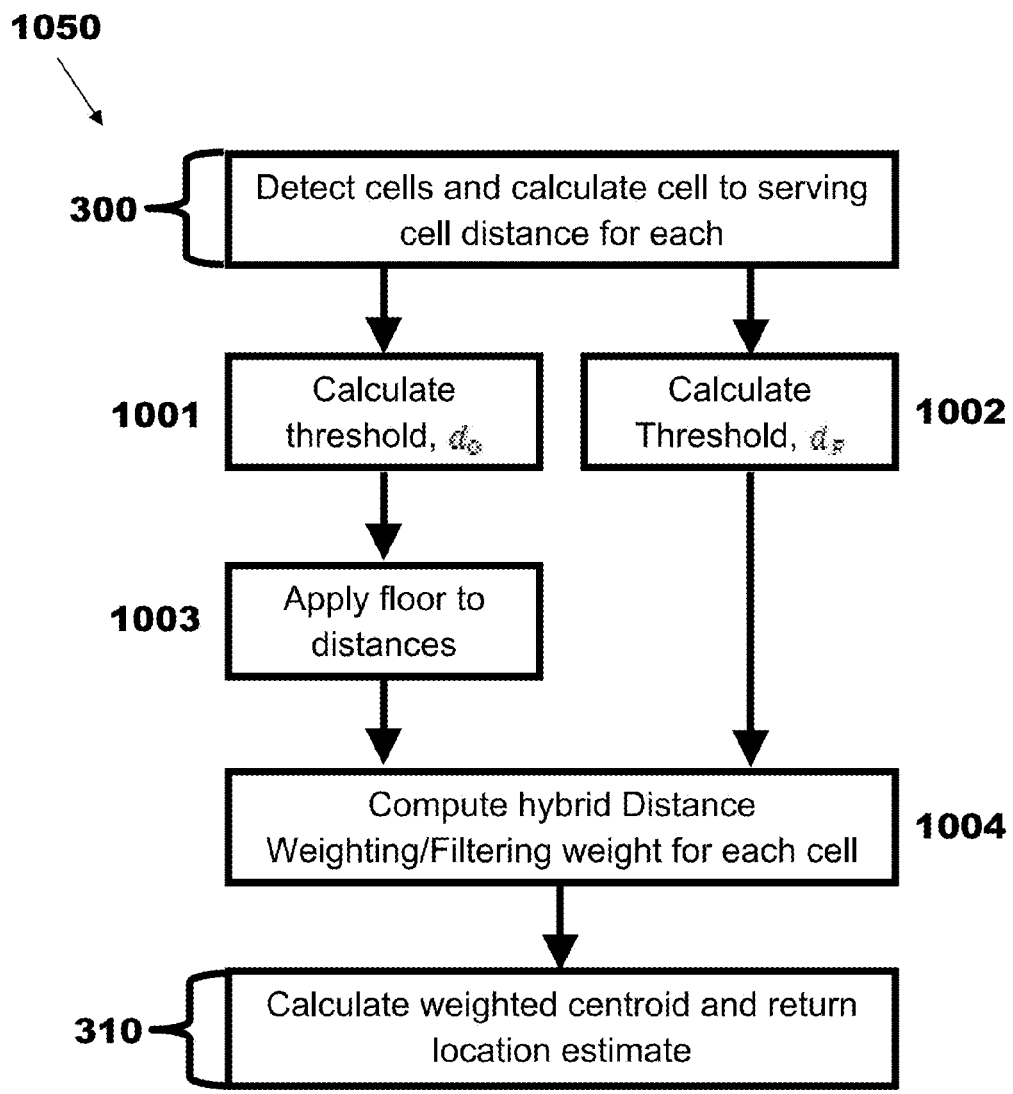
FIG. 10 illustrates a method for implementing the Distance Filtering concept in combination with a Distance Weighting concept.

In another embodiment, shown in FIG. 10, Distance Filtering is used to select a subset of the set of observed cells, and then the Distance Weighting techniques are employed to apply weights and calculate an estimate of the mobile device's location based on only the selected cells. The weights calculated using the hybrid system would be $$w_i = \frac{\frac{1}{\hat{d}_i} * I(d_{i1} \leq d_F)}{\sum_{j=1}^{N} \left(\frac{1}{\hat{d}_j} * I(d_{j1} \leq d_F)\right)},$$

which is guaranteed to return at least one positive weight so long as $d_F > 0$, and $$\hat{d}_i = \max\{d_{1i}, d_0\}$$

is used, as in the previous embodiment. Thus, to determine a location estimate, a method 1050 starts by performing the steps of group 300, and the method then uses the distances determined in steps 300 to compute a minimum allowed value, $d_0$, (step 1001) as described above. Also, a filtering threshold, $d_F$, is determined dynamically (step 1002), as set forth above. The method next applies the minimum allowed value, $d_0$, to the cell-to-cell distances so that all distances are estimated to be greater than zero (step 1003). Next, this information is used in the hybrid formula immediately above to determine the weights to be assigned to each cell (step 1004). Finally, the weighted centroid is determined to provide an estimate location of the mobile device using the steps of group 310.

As a further implementation variation, any of the techniques for estimating a mobile device's distance from a cell can be combined with alternative methods of estimating a device's distance from a cell location, e.g., RSS-based methods, TOA-based methods, TDOA-based methods, and/or other methods. When performing such a combination, either Distance Filtering and/or Distance Weighting can be combined with alternative weighting metrics corresponding to the alternative distance estimation method being used by adding a hybrid weighting factor, $u_1$, defined as follows:

$$u_i = (1-\alpha)w_i + \alpha v_i,$$

where $w_i$ is a weight calculated according to any of the techniques described above, $v_i$ is an alternative normalized weight corresponding to the alternative distance estimation method being used, $\alpha$ is a non-negative constant less than 1 (e.g., 0.5), and $u_i$ is a hybrid weight to be applied in place of $w_i$ when the final weighted centroid is determined. This is equivalent to computing separate location estimates using different schemes and then returning a weighted mixture of the separate locations as the final position estimate.

Figure 11:
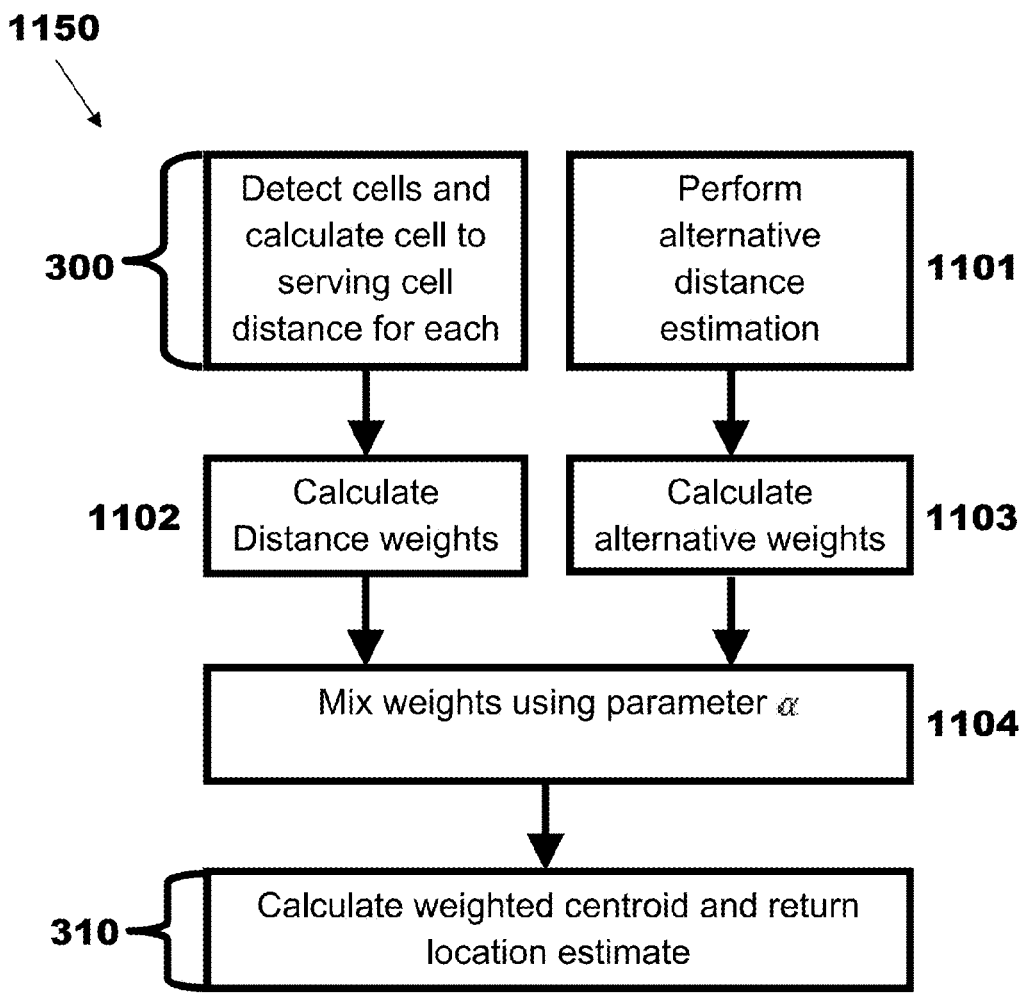
FIG. 11 illustrates a hybrid method for determining a location estimate.

FIG. 11 illustrates this hybrid method 1150 for determining a location estimate. Under this method, the steps of group 300 are performed as described above, and the Distance Filtering and/or Distance Weighting weight values are determined (step 1102) as set forth above. In addition, an alternative distance estimation is performed (step 1101), and alternative weights corresponding to the cells involved in the alternative distance estimation are determined (step 1103). The weight factor $w_i$ and alternative normalized weight, $v_i$, are combined (step 1104) using a non-negative constant $\alpha$ to determine a hybrid weight, $u_i$ for each cell. These weights are then applied to each cell according to the group of steps 310.

Figure 12:
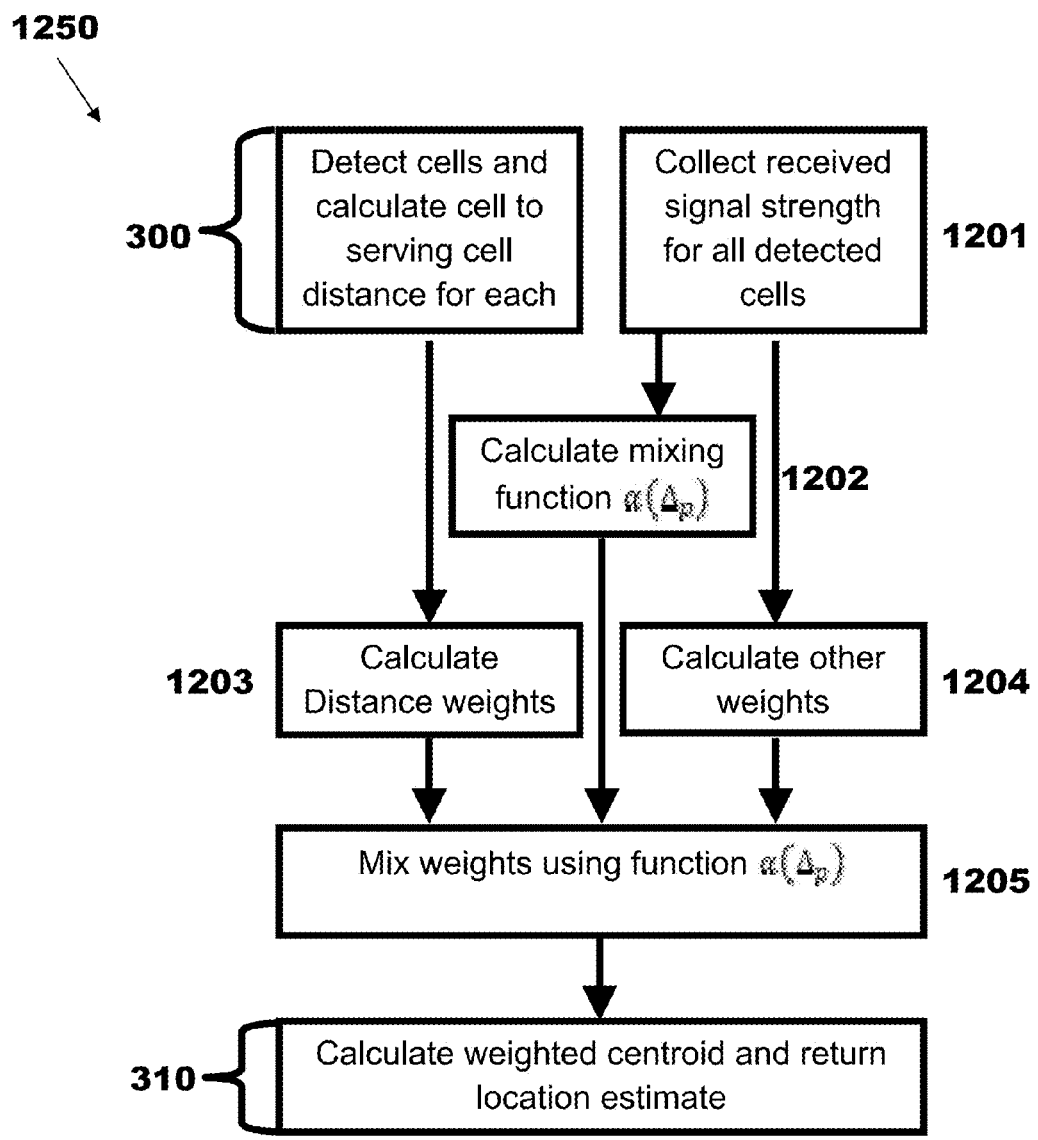
FIG. 12 illustrates a further hybrid method for determining a location estimate.

In another embodiment, shown in FIG. 12, the weight factor, $w_i$, and alternative normalized weight, $v_i$, can be combined in different proportions based on the statistics of the observed RSS or cell-to-cell distance values. For example, if a cell is designated as the serving cell according to the maximum received signal power, the designation may be less reliable if the difference between the maximum received power and the second largest received power is small. In other words, a mistake may have been made in identifying the serving cell. As a result, the influence of distance-based weights in the position estimate can be reduced in the hybrid weight function as follows:

$$u_i = \alpha(\Delta_p)w_i + (1-\alpha(\Delta_p))v_i,$$

where $\alpha(\Delta_p)$ is a function of the difference between the largest and second largest RSS values. In one implementation, $$\alpha(\Delta_p) = \frac{\Delta_p}{R},$$

where R is the dynamic range of the power measurements (i.e., the difference between the maximum and minimum possible reported RSS values).

According to this embodiment, the steps of group 300 are performed as described above, and any of the weight determination calculations described above is performed (step 1203). The RSS of the surrounding cells is detected (step 1201), and weights corresponding to RSS range estimates are calculated (1204). In addition, the RSS values are used to determine a value for the mixing function, $\alpha(\Delta_p)$ (step 1202). The weights are then combined using the mixing function-based hybrid weight function as set forth above (step 1205). These weights are then applied to each cell according to the group of steps 310.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., WiFi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention. The location estimate, distance from a particular location, and/or other position information can be displayed on the mobile device and/or transmitted to other devices and/or computer systems. Further, it will be appreciated that the scope of the present invention is not limited to the above-described embodiments, but rather is defined by the appended claims, and these claims will encompass modifications of and improvements to what has been described.

What is claimed is:

1. A method of estimating the position of a mobile device, the method comprising:
   identifying, by the mobile device, a plurality of fixed-position wireless communication stations in range of the mobile device based on the mobile device receiving signals transmitted by the plurality of fixed-position wireless communication stations;
   designating one of the plurality of fixed-position wireless communication stations from which signals are received by the mobile device as a designated reference station;
   retrieving location information for said designated reference station and one or more other neighboring stations of the plurality of fixed-position wireless communication stations from which signals are received by the mobile device;
   for each of the neighboring stations, determining a corresponding distance between the designated reference station and said neighboring station based on the location information;
   applying corresponding weighting factors to the location information of the designated reference station and of the neighboring stations, wherein the weighting factors corresponding to the neighboring stations are based on the distance between the designated reference station and the neighboring stations; and
   estimating a position of the mobile device based on the location information for the designated reference station and the neighboring stations weighted according to the applied weighting factors and the estimated distance from the mobile device to the designated reference station.

2. The method of claim 1, wherein estimating the position of the mobile device includes determining a weighted average position based on the location information and the weighting factors corresponding to said stations.

3. The method of claim 1, wherein neighboring stations that are closer to the designated reference station relative to other neighboring stations have corresponding weighting factors that are higher in value relative to weighting factors corresponding to other neighboring stations that are relatively more distant from the designated reference station.

4. The method of claim 3, further comprising assigning a minimum distance value as the distance between the designated reference station and a particular neighboring station when the distance between said stations based on the location information is less than the minimum distance value.

5. The method of claim 4, wherein the minimum distance value is based on an average signal coverage radius of at least the designated reference station or the neighboring stations.

6. The method of claim 4, wherein the minimum distance value is based on the median of each of the distances between the designated reference station and the neighboring stations.

7. The method of claim 6, wherein the minimum distance value is the greater of a minimum threshold distance value and the median of each of the distances between the designated reference station and the neighboring stations.

8. The method of claim 1, wherein a zero value weighting factor is applied to location information for any of the stations when the distance between the designated reference station and said station is greater than an upper threshold value.

9. The method of claim 8, wherein the upper threshold value is based on the median of each of the distances between the designated reference station and the neighboring stations.

10. The method of claim 9, wherein the upper threshold value is based on the greater of a fixed distance value and the median of each of the distances between the designated reference station and the neighboring stations.

11. The method of claim 8, further comprising estimating a signal strength of the signals transmitted by the designated reference station or the neighboring stations, and wherein a zero value weighting factor is applied to location information for any of said stations when the signal strength is less than a lower threshold value.

12. The method of claim 1, wherein the weighting factor applied to the location information for a particular station is further based on a ratio of (a) the inverse of the distance between the designated reference station and said particular station to (b) a sum of the inverse of all distances between the designated reference station and all other neighboring stations.

13. The method of claim 12, further comprising assigning a minimum distance value as the distance between the designated reference station and a particular neighboring station when the distance between said stations based on the location information is less than the minimum distance value.

14. The method of claim 13, wherein the minimum distance value is based on the median of each of the distances between the designated reference station and the neighboring stations.

15. The method of claim 14, wherein the minimum distance value is the greater of a minimum threshold distance value and the median of each of the distances between the designated reference station and the neighboring stations.

16. The method of claim 12, wherein a zero value weighting factor is applied to location information for any of the stations when the distance between the designated reference station and said station is greater than an upper threshold value.

17. The method of claim 1, further comprising:
for at least one of the designated reference station and the neighboring stations, determining a first weighting factor for said station based on the distance between the designated reference station and the corresponding station so that stations that are closer to the designated reference station relative to other stations have corresponding first weighting factors that are higher in value relative to first weighting factors corresponding to other stations that are relatively more distant from the designated reference station;
estimating a distance from the mobile device to at least one of the designated reference station and the neighboring stations based on the signals received by the mobile device transmitted by said stations;
for each of said stations for which distances were estimated based on the signals received by the mobile device, determining a second weighting factor corresponding to said station based on the signals received by the mobile device; and
for at least one of the designated reference station and the neighboring stations, determining a hybrid weighting factor for said station based on the first and the second weighting factor corresponding to said station;
wherein estimating the position of the mobile device includes applying the hybrid weighting factors to the location information for the corresponding stations and determining a weighted average position based on the location information and hybrid weighting factors corresponding to said stations.

18. The method of claim 17, wherein the estimating the distance from the mobile device to at least one of the designated reference station and the neighboring stations based on the signals received by the mobile device includes at least received signal strength-based techniques, time-of-arrival-based techniques, or time-difference-of-arrival-based techniques.

19. The method of claim 17, wherein determining a hybrid weighting factor includes combining the first and the second weighting factors according to a predetermined ratio.

20. The method of claim 17, further comprising:
measuring a received signal strength value for at least a portion of the signals received by the mobile device transmitted by at least one of the designated reference station and the neighboring stations;
determining a highest received signal strength value;
designating as the designated reference station that station having the highest received signal strength value; and determining a second highest received signal strength value;
wherein estimating the distance from the mobile device to at least one of the designated reference station and the neighboring stations is based on the received signal strength measurements; and
wherein determining a hybrid weighting factor includes combining the first and the second weighting factors according to a ratio based on (a) a difference between the highest and second highest received signal strength value and (b) a dynamic range of received signal strength values.

21. The method of claim 1, wherein the mobile device is a mobile telephone, a portable computer, a portable navigation device, or a personal digital assistant.

22. The method of claim 1, wherein the plurality of fixed-position wireless communication stations are cellular network installations.

23. The method of claim 22, wherein the cellular network is a GSM, IS-95, UMTS, WiMax, LTE, cdmaOne, or cdma2000 network.

24. The method of claim 1, wherein the designating of the designated reference station is based on a received signal strength measurement of the signals received by the mobile device.

25. The method of claim 1, wherein the designating of the designated reference station is based on information from an upper-layer protocol of a cellular telephone network.

26. The method of claim 1, wherein the location information for the designated reference station and the neighboring stations is stored on a server system remote from the mobile device.

27. The method of claim 1, wherein the location information for the designated reference station and the neighboring stations is stored on the mobile device.

28. The method of claim 1, wherein the designating of the designated reference station is based on at least one technique for estimating a distance between the mobile device and at least one of the plurality of fixed-position wireless communication stations.

29. The method of claim 28, wherein the designating of the designated reference station includes designating a fixed-position wireless communication station of the plurality that has the lowest estimated distance between said fixed-position wireless communication station and the mobile device.

30. The method of claim 1, wherein the estimating the distance from the mobile device to the designated reference station based on the signals received by the mobile device includes at least received signal strength-based techniques, time-of-arrival-based techniques, or time-difference-of-arrival-based techniques.

31. A non-transitory device-readable medium storing executable program instructions that when executed on a mobile device are operable to:
identify a plurality of fixed-position wireless communication stations in range of the mobile device from which signals are received;
designate one of the plurality of fixed-position wireless communication stations from which signals are received as a designated reference station;
retrieve location information for the designated reference station and one or more other neighboring stations of the plurality of fixed-position wireless communication stations from which signals are received;

determine a corresponding distance between the designated reference station and the at least one other neighboring station based on the location information;

applying corresponding weighting factors to the location information of the designated reference station and of the neighboring station, wherein the weighting factors corresponding to the neighboring stations are based on the distance between the designated reference station and the neighboring stations; and estimate a position of the mobile device based on the location information for the designated reference station and the neighboring stations weighted according to the applied weighting factors and the estimated distance from the mobile device to the designated reference station.

32. The non-transitory device-readable medium of claim 31, wherein neighboring stations that are closer to the designated reference station relative to other stations have corresponding weighting factors that are higher in value relative to weighting factors corresponding to other neighboring stations that are relatively more distant from the designated reference station, and the program instructions that when executed are operable to estimate the position of the mobile device are operable to:

determine the position of the mobile device based on the location information for the designated reference station and neighboring stations weighted as a weighted average position.

33. A method of estimating the position of a mobile device, the method comprising:

identifying, by the mobile device, a plurality of fixed-position wireless communication stations in range of the mobile device based on the mobile device receiving signals transmitted by the plurality of fixed-position wireless communication stations;

designating one of the plurality of fixed-position wireless communication stations that is closest to the mobile device as a designated reference station;

retrieving location information for the designated reference station and for one or more other neighboring stations of the plurality of fixed-position wireless communication stations;

for each of the one or more neighboring stations, determining a corresponding distance between the designated reference station and the respective neighboring station;

assigning corresponding weighting factors to the location information of the one or more neighboring stations, wherein each weighting factor is based on the distance between the designated reference station and the respective neighboring station; and estimating a position of the mobile device at least in part based on the location information for the one or more neighboring stations and the assigned weighting factors.

34. The method of claim 33, wherein a neighboring station that is closer to the designated reference station relative to another neighboring station is assigned a weighting factors that is higher in value relative to a weighting factor assigned to the another neighboring station that is relatively more distant from the designated reference station.

* * * * *